United States Patent [19]

Priesemuth

[11] Patent Number: 5,111,181
[45] Date of Patent: May 5, 1992

[54] ARRANGEMENT FOR RECOGNIZING WHETHER OR NOT A VEHICLE IS SLOWING DOWN

[76] Inventor: Wolfgang Priesemuth, Postkamp 13, 210 Breitenburg-Nordoe, Fed. Rep. of Germany

[21] Appl. No.: 400,164

[22] Filed: Aug. 29, 1989

[30] Foreign Application Priority Data

Feb. 2, 1989 [DE] Fed. Rep. of Germany ....... 3903047

[51] Int. Cl.$^5$ ............................................ B60Q 1/50
[52] U.S. Cl. ..................................... 340/467; 340/464; 340/479
[58] Field of Search ................... 340/467, 479, 463

[56] References Cited

U.S. PATENT DOCUMENTS

| | | | |
|---|---|---|---|
| 3,846,748 | 11/1974 | Hopwood | 340/467 |
| 3,846,749 | 4/1974 | Curry | 340/467 |
| 4,320,384 | 3/1982 | Carlson | 340/467 |
| 4,357,594 | 11/1982 | Ehrlich | 340/467 |
| 4,384,269 | 5/1983 | Carlson | 340/467 |
| 4,769,629 | 9/1988 | Tigwell | 340/467 |

Primary Examiner—Jin F. Ng
Assistant Examiner—Dov Popovici
Attorney, Agent, or Firm—Robert W. Becker & Associates

[57] ABSTRACT

An arrangement for recognizing, via brake lights provided on a vehicle, especially a motor vehicle, whether or not the vehicle is slowing down, whereby the brake lights can be turned on upon activation of a vehicle brake. A sensor mechanism is provided that delivers a signal and/or a succession of signals having a value that corresponds to the deceleration state of the vehicle at any given time. The brake lights are electrically activated in a manner that corresponds to the value of the signal at least upon activation of the vehicle brake.

8 Claims, 1 Drawing Sheet

ARRANGEMENT FOR RECOGNIZING WHETHER OR NOT A VEHICLE IS SLOWING DOWN

BACKGROUND OF THE INVENTION

The present invention relates to an arrangement for recognizing, via brake light means provided on a vehicle, especially a motor vehicle, whether or not the vehicle is slowing down, whereby the brake light means can be turned on upon activation of a vehicle brake via a switch that is connected therewith.

As every motor vehicle driver knows, and as is encountered almost daily when driving in traffic, the brake lights of a motor vehicle that is in front of the driver already begin to light up as soon as the brake is actuated or contacted slightly by the driver, even though in actuality no braking effect has occurred yet. The reason for this is that the contact point of the brake light switch that is generally coupled at a suitable location with the foot brake of the motor vehicle is set in such a way that the brake light means, which are mounted so as to be visible from the outside of the vehicle, light up already upon the lightest contact on the brake pedal, i.e. upon actuation of the brake.

The result of this is that often motorists driving behind such a vehicle become alarmed because based on the overall traffic situation there appears to be absolutely no reason for braking. As a result of this alarm, a driver who has noticed the brake lights of the vehicle in front of him lighting up often himself abruptly brakes his vehicle, and sometimes even more severely, so that out of a completely noncritical driving situation in flowing traffic, a chain reaction, and hence serious accidents, can occur that can involve a number of vehicles that are driving behind one another in the manner of a column, since the chain reaction could continue to the last member of the column.

A further great source of danger that is often observed in traffic is that vehicles, generally trucks and busses, have at their disposal a so-called motor brake that is capable of exerting considerable negative accelerations, i.e. decelerations upon the vehicle. If such a vehicle is appropriately braked via the motor brake, no brake light means light up at all during such actuation of the known vehicle brakes, which often results in a vehicle driving behind the braking vehicle running into the latter, which could have been avoided had the driver in back been aware of the process by seeing a brake light means light up.

Both the first problem and the second problem mentioned above, which concern the general safety of motor vehicles in traffic, have very detrimental results since a considerable proportion of accidents that occur in traffic can be attributed to these problems.

It is therefore an object of the present invention to provide an arrangement for recognizing whether or not a vehicle is slowing down whereby others that are also driving in traffic can easily recognize the degree of braking intensity of a vehicle, and taking into consideration this information can rapidly and reliably undertake their own actions with regard to the vehicular traffic, whereby the arrangement should be suitable for installation in every vehicle, and furthermore should be economical and should also be capable of being subsequently installed or retrofitted in existing brake light means of vehicles.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
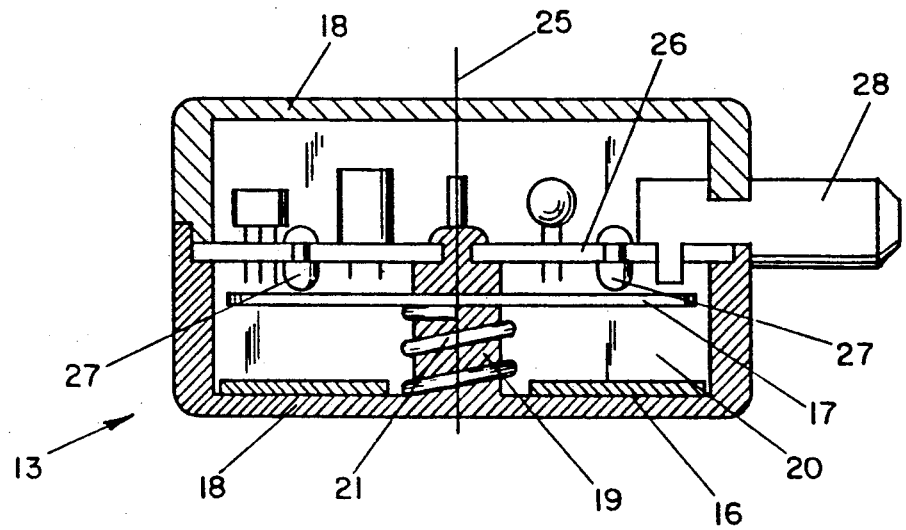
FIG. 1 is a cross-sectional view through one exemplary embodiment of an inventive sensor mechanism showing the fixed and the movable capacitor plate.

The arrangement of the present invention is characterized primarily by a sensor mechanism for delivering to the brake light means a signal and/or a succession of signals having a value that corresponds to the deceleration state of the vehicle at any given time, whereby the brake light means is electrically activated in a manner that corresponds to the value of the signal at least upon activation of the vehicular brake.

The advantage of the inventive arrangement is essentially that the degree of braking of the vehicle can be externally recognized via the brake light means, for example in that where the braking is more severe, the brake light means become brighter, i.e. have a greater intensity, than where only a light braking action is undertaken.

Pursuant to one advantageous specific embodiment of the present invention, the sensor mechanism includes an element for detecting the deceleration of the vehicle. Elements of this type can, for example, be carbon rods that extend to different depths into a conductive liquid as a function of the respective deceleration, or can also be a beam of light that is conducted on a photosensitive element via a transparent plastic foil, the thickness of which changes as a function of the deceleration of the vehicle. The change of the resistance, i.e. the change of the power delivered by the photo-sensitive element is then, as an appropriately converted signal, a factor for the corresponding degree of deceleration.

Pursuant to one advantageous specific embodiment of the present invention, the element essentially includes a capacitor as part of a resonant circuit, the capacitance of which can vary as a function of the deceleration of the vehicle. A capacitor disposed in a resonant circuit can, especially since it is a relatively economically available electrical circuit component, be set with relatively high precision to a predetermined magnitude, and hence a predetermined resonance frequency of a resonant circuit can be set, whereby alterations of the resonant circuit caused by the variation of the capacitance of the capacitor, are very suitable reference factors for the cause of the variation of the capacitance of the capacitor, namely the deceleration of the vehicle.

With one very straightforward yet effective specific embodiment of the inventive arrangement, the capacitor of the resonant circuit is formed by an air capacitor, the two capacitor plates of which are essentially disposed transverse to the longitudinal axis of the vehicle with the first capacitor plate being embodied as a fixed plate that is disposed on a casing of the sensor mechanism, while the second capacitor plate is embodied as a movable plate that is essentially perpendicular to the first plate and moves perpendicular thereto. Because of the inertia of the movable capacitor plate, the capacitance of the capacitor changes when the vehicle is negatively accelerated, i.e. decelerated during a braking action.

Pursuant to another advantageous specific embodiment of the present invention that can be realized particularly economically, which concerns installation in motor vehicles, a guide element extends essentially centrally from the casing into the interior thereof and serves for the parallel guidance of the second movable capacitor plate during displacement thereof relative to the fixed capacitor plate during a deceleration process. The guide element, which can, for example, be embodied as a pin or rib, is in this connection preferably integral with the casing, which makes it economical to produce. The end position in the state of rest, i.e. when the two capacitor plates are spaced at a maximum distance from one another, is preferably effected by spring means, for example in the form of a compression spring, that keeps the first and second capacitor plates spaced from one another.

As indicated previously, in principle any suitable element can be used in the sensor mechanism for detecting the deceleration of the vehicle. In addition to using a capacitor as the deceleration-detecting element, a resistance device can also be advantageously used that varies as a function of the deceleration of the vehicle, for example in that the sliding contact of a mechanical resistance element (potentiometer) varies as a function of the deceleration of the vehicle.

Independent of the construction of the element that directly detects the deceleration of the vehicle, the element itself is advantageously coupled with an electrical frequency voltage transformer that delivers an appropriate voltage level as a function of the dissonance of the resonant circuit. The voltage that is supplied is therefore a direct measure of the degree of deceleration and can be converted in a relatively simple manner to a control signal, so that the brake light means is activated with an intensity that illuminates in conformity with this voltage.

For this purpose, the frequency voltage transformer is advantageously coupled with a voltage-controlled pulse-enlarging modulator that generates a signal of a specific length in conformity with the level of voltage supplied by the frequency voltage transformer. The pulse width in conformity with the primary voltage level, pursuant to one possible mode of operation, switches, for example the brake light means, on for only a specific time interval, and only when the vehicle is again braked is the brake light means again switched on for only a specific time interval in conformity with the primary voltage level, etc.

Finally, pursuant to one advantageous specific embodiment of the inventive arrangement, the output of the pulse-enlarging modulator, for switching on the brake light means, is delivered to an output switch step that can be suitably dimensioned in conformity with the anticipated output as determined by the type and number of brake lights.

Further specific features of the present invention will be described in detail subsequently.

DESCRIPTION OF PREFERRED EMBODIMENTS

Referring now to the drawing in detail, an essential component of the arrangement 10 is the sensor mechanism 13 for detecting the state of deceleration of a vehicle, which is not separately shown in the drawing. Due to its controlling function, the sensor mechanism 13 will be described first, whereupon the operation of the arrangement 10 as a whole will then be described in detail subsequently.

The sensor mechanism 13 comprises a casing 18 (see FIG. 1) that in the illustrated embodiment consists of two half shells that can be joined together in any suitable manner. Fixedly disposed on the interior base of one part of the casing 18 is a capacitor plate 16. Extending essentially from the central portion of the base of the same part of the casing 18 into the interior 20 thereof is a guide element 19 that in the illustrated embodiment, although this is not absolutely necessary, has a circular cross-sectional configuration. A capacitor plate 17 is longitudinally movable along the guide element 19, i.e. in the axial direction of the axis 25 thereof. A spring means 21 in the form of a compression spring is disposed between the fixed capacitor plate 16, i.e. the base of the pertaining part of the casing 18, and the movable capacitor plate 17. Disposed above the movable capacitor plate 17 is a printed circuit board 26 that is supported on the guide element 19 and on the U-shaped side parts or ribs of the casing 18. Although not separately illustrated in the drawing, the printed circuit board 26 can be connected to the casing 18 and the guide element 19 via clip connections. Spacer pins 27 extend from the printed circuit board 26 in a direction toward the movable capacitor plate 17. In an end position, for example the position illustrated in FIG. 1, the spacer pins 27 hold the movable capacitor plate 17 securely in place, i.e. delimit the axial movability thereof in the direction of the axis 25.

Symbolically indicated on the printed circuit board 26 are several electronic control components, such as resistors and capacitors, which constitute the further control components of the arrangement 10 that will be described in conjunction with FIG. 2. The upper portion of the casing 18 is disposed about the printed circuit board 26 and closes off the sensor mechanism 13 in an absolutely dust proof manner. Electrical contacts 28 lead to the outside from the printed circuit board 26 for suitable electrical connection to the other components of the arrangement 10. FIG. 1 illustrates merely symbolically one electrical contact 28 that within the casing engages the printed circuit board 26, with which it is suitably connected via appropriate conduction paths.

The capacitor 15, which is formed by the fixed capacitor plate 16 and the movable capacitor plate 17, forms a portion of a resonant circuit 14 and represents an adjustable component of this resonant circuit.

The sensor mechanism 13 furthermore includes a frequency voltage transformer, a pulse-enlarging modulator 23, and an output switch step 24. The resonant circuit 14, which is illustrated merely symbolically in the block diagram of FIG. 2, is connected with the input of a frequency voltage transformer 22. The frequency voltage transformer, which delivers at the output a voltage level in conformity with the frequency dissonance or incremental frequency of the resonant circuit 14, is in turn connected to the input of a pulse-enlarging modulator 23. The output of the pulse-enlarging modulator, at which is disposed a pulse having a width that is in conformity with the voltage level at its input, is connected to the input of an output switch step 24. The output switching function of the output switch step is symbolically shown in the illustrated embodiment by a transistor, the collector of which is connected to the positive pole of a supply voltage, while the emitter thereof is connected to two brake light means 11 of a vehicle. The other poles of the brake light means 11 are connected to the negative pole of a supply voltage. The poles of the brake light means 11 on the emitter side can in turn be connected to one pole of a switch 12, while the other pole of the switch 12 can be connected to the aforementioned positive pole of the supply voltage. The switch 12 symbolizes a brake light switch, as is encountered in standard motor vehicles, whereby this brake light switch is generally connected to the foot brake, i.e. the brake pedal, so that when the brake is operated, the brake light switch closes the circuit to the brake light means 11.

It should be noted that with regard to the illustrated embodiment, the arrangement of the switch 12 in the overall arrangement 10 as described in conjunction with the illustration of FIG. 1, is just one possible arrangement, and that it is also possible to arrange the switch 12 directly in the collector-emitter circuit, i.e. in series with the output transistor of the output switch step 24, so that the arrangement 10 can activate the brake light means 11 only if in addition the switch 12, i.e. the brake light switch, is activated by operation of the vehicle brake.

The sensor mechanism 13 is disposed in a vehicle (not illustrated) in such a way that the two capacitor plates 16, 17 of the capacitor 15 are disposed essentially transverse to the longitudinal axis of the vehicle, whereby the longitudinal axis of the vehicle is, in this case, essentially aligned with the axis 25 of the sensor mechanism 13. Thus, when the vehicle is braked, the movable capacitor plate 17, due to its inertia, carries out a movement that is perpendicular relative to the fixed capacitor plate 16, and in particular essentially in the axial direction of the axis 25. The reduction of the space between the two capacitor plates 16, 17 during the negative acceleration of a vehicle, i.e. a deceleration or braking action, effects a change of the capacitance of the capacitor 15 and, in a known manner, a dissonance of the resonant circuit 14 in which the capacitor 15 is one or the time-determining component of the resonance frequency of the resonant circuit 14. The frequency voltage transformer 22 that is connected to the resonant circuit 14 converts a frequency into a voltage having a level that corresponds to the frequency of the resonant circuit 14. Different frequencies of the resonant circuit 14 effect different voltage levels at the output of the frequency voltage transformer 22.

The variously possible voltages of the frequency voltage transformer 22 are converted in the pulse-enlarging modulator 23 into pulses that have correspondingly different lengths of time and that can be digital pulses. In conformity with the length of the pulse at the output of the pulse-enlarging modulator 23, the output switch step 24 is activated and switches the brake light means 11 on and off at a specific time interval in conformity with the length of the pulse.

The pulse-enlarging modulator 23 can be embodied in such a way that a timing pulse is continually transmitted to the output switch step 24. If the positive portion of the signal at the output of the pulse-enlarging modulator is longer than the negative portion thereof, which is effected by the braking of the vehicle and the thereby resulting dissonance of the resonant circuit 14, the excitation time of the output transistor of the output switch step 24 becomes longer, so that the brake light means 11 is activated at an increased rate, i.e. during negative acceleration or during braking of the vehicle the brake light means begin to light up. The greater the negative acceleration, i.e. deceleration effect upon the capacitor 15, thus causing a greater dissonance of the resonant circuit 14, the greater is the positive portion of the pulse at the output of the pulse-enlarging modulator 23, so that accordingly the timing portion of the control pulse for the output transistor of the output switch step 24 is increased, with the result that per pulse, the brake light means 11 remains switched-on for a longer period of time and is therefore lit more brightly.

Figure 2:
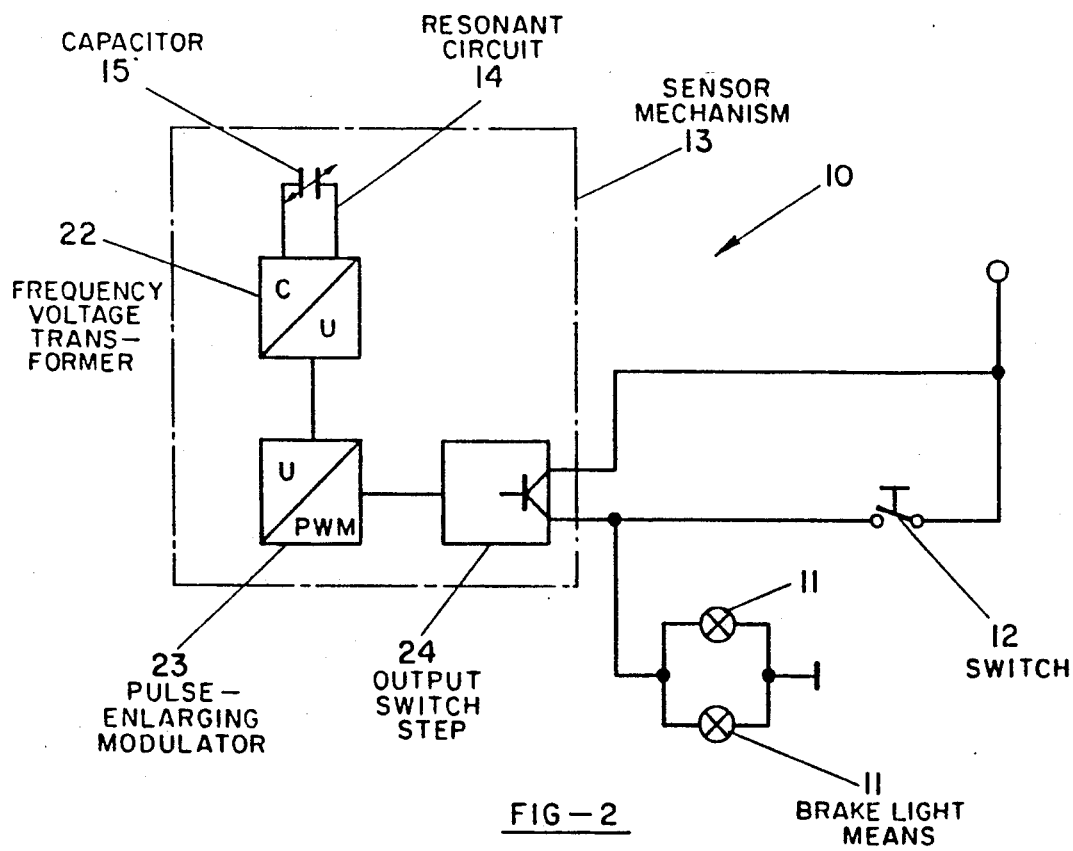
FIG. 2 is a block diagram showing the basic components of the inventive arrangement.

It should be noted that the type of activation of the brake light means 11 described in conjunction with the illustration of FIG. 2 as a function of the intensity of the braking represents only one possible technical realization. Another possible realization, which is not separately illustrated, consists in the use of linear analog switching components which effects a linear activation of the output transistor to control the brake light means 11, so that in a non-cyclical manner the brake light means 11 are activated directly as a function of the dissonance of the resonant circuit 14 and intensively light up in conformity with the intensity of the braking of the vehicle, i.e. in conformity with the negative acceleration.

The present invention is, of course, in no way restricted to the specific disclosure of the specification and drawing, but also encompasses any modifications within the scope of the appended claims.

What I claim is:

1. An arrangement for recognizing, via brake light means provided on a vehicle, especially a motor vehicle, whether or not said vehicle is slowing down, whereby said brake light means can be turned on upon activation of a vehicle brake via a switch that is connected therewith, said arrangement further comprising:
   a sensor mechanism for delivering to said brake light means signal means having a value that corresponds to the deceleration state and intensity of deceleration of said vehicle at any given time, whereby said brake light means is electrically activated in a manner that corresponds to said value of said signal means at least upon activation of said vehicle brake, whereby said sensor mechanism includes an element for detecting deceleration of said vehicle, with said element essentially including a capacitor as part of a resonant circuit, the capacitance of which varies as a function of the deceleration of said vehicle.

2. An arrangement according to claim 1, in which said capacitor is formed by an air capacitor having two capacitor plates that are disposed essentially transverse to a longitudinal axis of said vehicle.

3. An arrangement according to claim 2, in which said sensor mechanism includes a casing, with said capacitor having a first fixed capacitor plate that is disposed on said casing, and a second movable capacitor plate that is movable essentially perpendicular to said first fixed capacitor plate while being disposed parallel thereto.

4. An arrangement according to claim 3, which includes a guide element that extends essentially centrally from said casing into the interior thereof and serves for a parallel guidance of said second movable capacitor plate.

5. An arrangement according to claim 3, which includes spring means for keeping said first fixed capacitor plate and said second movable capacitor plate spaced from one another.

6. An arrangement for recognizing, via brake light means provided on a vehicle, especially a motor vehicle, whether or not said vehicle is slowing down, whereby said brake light means can be turned on upon activation of a vehicle brake via a switch that is connected therewith, said arrangement further comprising:
a sensor mechanism for delivering to said brake light means signal means having a value that corresponds to the deceleration state and intensity of deceleration of said vehicle at any given time, whereby said brake light means is electrically activated in a manner that corresponds to said value of said signal means at least upon activation of said vehicle brake, whereby said sensor mechanism includes an element for detecting deceleration of said vehicle, with said element being part of a resonant circuit and being coupled with a frequency voltage transformer that as a function of the dissonance of said resonant circuit delivers a voltage having a corresponding level.

7. An arrangement according to claim 6, in which said frequency voltage transformer is coupled with a voltage-controlled pulse-enlarging modulator that generates a signal of a specific length in conformity with a level of a voltage delivered by said frequency voltage transformer.

8. An arrangement according to claim 7, in which an output of said pulse-enlarging modulator is delivered to an output switch step for activating said brake light means.

* * * * *